United States Patent
Raphaeli et al.

(10) Patent No.: US 8,193,913 B2
(45) Date of Patent: Jun. 5, 2012

(54) COMMUNICATION AND DISTANCE MEASUREMENT IN AN ADDRESSED WIDE BAND RFID SYSTEM

(75) Inventors: Dan Raphaeli, Kfar Saba (IL); Gideon Kaplan, Kiryat Ono (IL)

(73) Assignee: Zebra Enterprise Solutions Corp., San Jose, CA (US)

(*) Notice: Subject to any disclaimer, the term of this patent is extended or adjusted under 35 U.S.C. 154(b) by 612 days.

(21) Appl. No.: 11/574,883

(22) PCT Filed: Sep. 12, 2005

(86) PCT No.: PCT/IL2005/000967
§ 371 (c)(1),
(2), (4) Date: Mar. 8, 2007

(87) PCT Pub. No.: WO2006/030422
PCT Pub. Date: Mar. 23, 2006

(65) Prior Publication Data
US 2008/0186136 A1     Aug. 7, 2008

Related U.S. Application Data

(60) Provisional application No. 60/609,240, filed on Sep. 14, 2004.

(51) Int. Cl.
*H04Q 5/22* (2006.01)
(52) U.S. Cl. .................................. 340/10.2; 340/10.1
(58) Field of Classification Search ............... 340/10.1, 340/10.2, 10.31, 10.3, 10.4, 572.1, 539.26
See application file for complete search history.

(56) References Cited

U.S. PATENT DOCUMENTS

| | | | |
|---|---|---|---|
| 5,450,492 A | | 9/1995 | Hook et al. |
| 5,892,441 A | * | 4/1999 | Woolley et al. ........ 340/539.26 |
| 6,362,738 B1 | | 3/2002 | Vega |

(Continued)

FOREIGN PATENT DOCUMENTS
WO    WO03/098528    11/2003

OTHER PUBLICATIONS

Sloan, A., Computer Communications, Principles and Business Applications, McGraw-Hill (1994), *Wide Area Networks*, pp. 153-157.

(Continued)

*Primary Examiner* — Nabil Syed
(74) *Attorney, Agent, or Firm* — Alston & Bird LLP

(57) ABSTRACT

A method for communicating between elements including a reader and tags of a radio frequency identification system. The method includes addressing a wide-band-message signal by including in the signal an identifier of the first tag. The addressed wide-band-message signal is transmitted by the reader. A first tag waits to receive the addressed wide-band-message signal; and upon receiving the addressed wide-band-message signal and recognizing the identifier, the first tag responds to the addressed wide-band-message signal by transmitting an addressed wide-band response signal either back to the reader or to a relaying tag. The tag relays to another element of the system by transferring at least one datum of the query from the addressed wide-band-message signal to the addressed wide-band response signal, where the elements are readers or tags. The system and method allow for many parallel wide band addressed links, and for position determination using at least two tags with known locations.

23 Claims, 8 Drawing Sheets

U.S. PATENT DOCUMENTS

| | | |
|---|---|---|
| 2002/0030596 A1* | 3/2002 | Finn et al. .................. 340/572.1 |
| 2002/0175805 A9* | 11/2002 | Armstrong et al. ........ 340/10.31 |
| 2003/0007473 A1 | 1/2003 | Strong et al. |
| 2003/0109270 A1* | 6/2003 | Shorty .......................... 455/517 |

OTHER PUBLICATIONS

International Search Report and Written Opinion for Application No. PCT/IL05/00967 dated Mar. 3, 2008.

* cited by examiner

COMMUNICATION AND DISTANCE MEASUREMENT IN AN ADDRESSED WIDE BAND RFID SYSTEM

FIELD AND BACKGROUND OF THE INVENTION

The present invention relates to radio frequency tags for communication, identification and distance measurement, in particular to a system of radio frequency communication with addressed unicast and multicast tags with wide-band technology.

Radio Frequency IDentification (RFID) is a method of storing and remotely retrieving data using devices called RFID tags. An RFID tag is a small object that can be attached to a product, animal, or person. RFID tags receive and respond to radio-frequency queries from an RFID reader. RFID tags can be either active or passive. Passive tags require no internal power source, whereas active tags require a power source. Active RFID tags have an internal power source, and typically have longer range and larger memories than passive tags.

An RFID system includes several components including mobile tags, tag readers, and application software. The RFID system enables a query to be received by the mobile tag and the tag responds with data. The data is received by an RFID reader and processed according to the needs of a particular application. The data transmitted by the tag may provide identification or location information, or specifics about the product tagged, such as price, color, date of purchase.

RF identification (RFID) systems are used to track objects, animals and/or people in a large range of applications. As an example, RFID is used to track books in a library. Security gates includes an RF transceiver as part of the RFID reader which detects whether or not a book has been properly checked out of the library. When the book returns, the tag attached to the book is detected and an appropriate record is updated in the library system. In another application, RFID readers previously located in a warehouse are used to identify certain objects (for example, on a track entering the warehouse), or to find the location of certain objects, by communicating with their tags and measuring the position of their tags.

In many cases it is desired to have several communication links in parallel between readers and tags or between tags to support various network topologies and support a high aggregate rate per a given space. For simplicity, RFID systems do not include time synchronization between elements of the network. In such a network of the prior art there are "collisions" between simultaneous transmissions (namely two or more transmissions using the same time, frequency or code space). The RFID system has media access control to support various networking modes including retransmission of possibly lost messages due for instance to collisions.

A method for avoiding collisions as used with the ALOHA protocol is described in "Computer Communications", Principles and Business Applications, by Andy Sloane, Mcgraw Hill ISBN 0 07 709443 3. After a collision, the transmitter waits a pseudo-random period before re-transmitting the signal, so that the chance of a collision occurring between the retransmitted signals is small. The random periods are longer than the transmitted signals, such that response signals of transmitters selecting different random delays are not likely to collide.

In certain RFID applications, it is important to ascertain that the identified tag is located within a certain distance from the reader. For example, the identification of the tag may be required in order to open a door to an access-limited area. If a tag which is positioned remotely from the reader is identified by the reader, the door may be opened to an unauthorized individual. Limiting transmission range of the reader is not a potential solution to this problem because near the limit of the transmission range tags may not be identified for instance due to different tag orientations and/or on occlusion between the tag and reader.

In U.S. Pat. No. 6,362,738, issued to Vega, an RFID reader is disclosed containing a detector circuit for detecting the presence of a signal carrier frequency transmitted by the transponder in response to a signal from the reader. The detector circuit has a resonator circuit which is connected to a receiver electrode. The resonator includes a piezoelectric element with a high quality factor 'Q' at the resonant frequency to enhance sensitivity. The alarm carrier signal is rectified and fed to either a peak detector or an envelope detector circuit. A voltage source generates a voltage threshold to allow for operating range adjustment. A comparator compares both voltages and generates an alarm signal if the voltage signal reaches the threshold voltage. The system disclosed in U.S. Pat. No. 6,362,738 limits the range of the tags it identifies by relating only to signals whose voltage level is above a predetermined threshold. The threshold may be user-adjusted in order to allow for different ranges of operation. The use of power thresholds is inaccurate, as the power may depend on the orientation of the tag and/or on obstructions between the tag and the reader. Thus it would be desirable to be able to measure the distance, or relative distance of specific tag(s) from a reader, possibly using other tags whose location is known.

As stated above, a shortcoming of conventional RFID systems, is a limited ability to establish multiple parallel links, for instance between a reader and two tags. Reference is now made to FIG. 1 which illustrates schematically RFID signals between an RFID reader and a tag. Commonly, a reader transmits a packet 101, and waits for a tag to respond with a packet 103. Typically, packets 101 and 103 are on the order of 1 millisecond long. Because of relatively long packet length, the ability to achieve multiple parallel links is limited.

PCT International Patent Application Publication No. WO 2003/098528, (PCT Patent Application No. PCT/IL2003/00358), by the first inventor of the present invention, entitled "Method and system for distance determination of RF tags" is incorporated by reference for all purposes as if fully set forth herein. PCT/IL2003/00358 discloses an RFID system having the capability of automatically identifying unknown tags by sending a broadcast interrogation wide-band message signal and receiving responses from all tags that receive the message signal. Reference is now made to FIG. 2 (prior art) which illustrates the use of wide-band signals (UWB) in an RFID system 10 of the prior art (described in PCT/IL2003/00358). A reader 201 transmits a pulse sequence or symbol 205. Preferably, a wide band signal is organized into three intervals including three parts: a preamble, data and a response period. In each of these parts, symbols 205 are transmitted by means of pulse transmissions, where the time between symbols is denoted $T_1$ typically on the order of 10 microseconds. The actual pulse sequence transmission time $T_2$ for each symbol is substantially shorter than $T_1$, typically ~100 nanoseconds. Such pulses are beneficial for reducing the peak to average ratio of the transmitter, both for easier implementation and for passing regulatory peak power limits where applicable. As an example in a pulse train, each pulse sequence 205 is composed of N e.g. 11 narrow pulses, each with a polarity determined by a binary sequence which is chosen for autocorrelation and synchronization properties with a flat spectrum. Tags 203a and 203b respond respectively with pulse sequences 207a and 207b also with time interval $T_2$ of about 100 nanoseconds and time interval $T_1$ between pulse sequences 207 (on the order of 10 microseconds, as mentioned above). The use of very short pulse sequences 205 and 207 with a long time interval between pulse sequences 205 and 207 allows a relatively large number of parallel links between reader 201 and multiple tags 203.

However, several features useful in RFID networks are not supported using the prior art system of PCT/IL2003/00358. A prior art RFID system which uses broadcast wide band signals cannot readily communicate with a relatively distant tag 203 or a tag 203 which is situated behind an attenuating obstacle, using another addressed tag acting as a relay. Moreover, the system of PCT/IL2003/00358 is not suitable for measuring distance between a reader 205 and a tag 203 by triangulation which employs other tags 203.

There is thus a need for, and it would be highly advantageous to have a system for RFID wide band communications which overcome the above mentioned disadvantages of prior art wide band RFID Systems.

The term 'channel' as used herein refers to an allocation of resources providing a link between a transmitter and a receiver. Exemplary channels are frequency band, time slot, space direction and spreading code. The term "wide band signal" as used herein refers to a spread spectrum signal type such as: direct sequence (DS), frequency-hopping (FH), multi-carrier CDMA, chirp signals, short or long pulses of any shape with or without time hopping. The terms "wideband" and "spread spectrum" are used herein interchangeably. The term "reader cell" or "cell" as used herein refers to a previously determined bounded volume, such as a volume bounded within a specified radius or between two radii, the volume determined by the ability to successfully achieve wireless communications between a reader and tag in the volume. Tags located in the reader cell are valid tags for the current session. The term "signal' as used herein refers to one or more signals in one logical transmission period. The term "broadcast" as used herein refers to a message that are intended for any receiver of the system and consequently does not include an identifier or address of one or more intended receivers. The term "unicast" is used herein to refer to a message intended for and addressed to a single recipient. The term "multicast" is used herein to refer to a message intended for and addressed to multiple recipients. The term "addressed message signal" or "addressed wide band message signal" or "addressed wide band response signal" as used herein refers to a unicast or a multicast message signal, i.e. to a message signal that addresses one or more previously defined system elements, i.e. tags or readers by including respective identifiers in the signal. Although the term "message signal" usually refers to a query sent by a reader and the term "response signal" usually refers to a response sent by the tag to the reader in response to the query, in the context of the present invention, the terms "message signal" and "response" signal are used herein interchangeably. In particular, in the context of the present invention, when a single message may be both a query and a response, the term "response signal" is typically used. The terms "round trip delay time" "time delay", "delay time" or "time information including time of flight" are used interchangeably and refer to an interval of time as measured by a single system element between transmitting a transmitted signal and receiving a response signal in response to the transmitted signal. Reference: http://en.wikipedia.org/wiki/RFID

SUMMARY OF THE INVENTION

According to the present invention there is provided a method for communicating and distance measurement between elements including a reader and tags of a radio frequency identification system. The method includes addressing a wide-band-message signal by including in the signal a destination identifier of the first tag and producing a wide-band-message signal addressed to the first tag. Preferably, the signals include pulse sequences, and the pulse sequence includes a short train of pulses. Preferably, the response to the addressed wide band message signal begins during the reception of the addressed wide band message signals. The addressed wide-band-message signal is transmitted by the reader. A first tag waits to receive the addressed wide-band-message signal; and upon receiving the addressed wide-band-message signal and recognizing the identifier, the first tag responds to the addressed wide-band-message signal by transmitting an addressed wide-band response signal. Preferably, prior to responding, the first tag addresses the addressed wide-band response signal by including in the response signal a destination identifier of another element of the system, e.g. reader or tag. Preferably, prior to the transmission by the first tag of an addressed wide-band response signal, the transmission of the response signal is delayed by a pseudo-random delay period in order to reduce a probability of a collision. Preferably, the method further includes relaying at least a portion of a query from the reader to the other element of the system by transferring at least one datum of the query from the addressed wide-band-message signal to the addressed wide-band response signal. Preferably, a distance is determined from the reader to the first tag by measuring a round trip time delay including a time of flight of the addressed wide-band-message signal transmitted to the first tag and/or the addressed wide-band response signal. In order to obtain the first tag location, another distance from another element of the system, e.g. reader or tag, is measured to the first tag by measuring a round trip time delay including a time of flight of other wide-band signals communicating between the first tag and the other element. Position information of the first tag is then calculated based on these distances, as is known in the art. Preferably, the reader determines a probability of a collision between expected wide band response signals and when the probability is greater than a previously determined threshold, the reader transmits an additional addressed wide band message signal. The additional addressed wide band message signal initiates a new communication session, while addressing fewer elements of the system and reducing the collision probability. Preferably, the waiting of the tag includes scanning in the time domain. Preferably, the tag is not active all the time and conserves power by deactivating into a sleep mode; while activating periodically with a predefined duty cycle. Preferably, the waiting of the tag includes scanning in the frequency domain by sweeping a center frequency in predefined steps such as to cover a desired frequency range until said addressed wide band message signal is detected.

The system is capable of supporting multiple, independent addressed wide-band signals in parallel. Preferably, a second wide-band-message signal is addressed by including in the signal a destination identifier of the second tag, to produce a second addressed wide-band-message signal. The second addressed wide-band-message signal is transmitted destined for the second tag. The second tag waits to receive the second addressed wide-band-message signal; and upon receiving the second addressed wide-band-message signal and recognizing the second-tag identifier, the second tag responds to the second addressed wide-band-message signal by transmitting second wide band addressed response signal.

The system is capable of relaying information through tags to other tags and further to measure a tag location using known locations of other tags. Preferably, the first addressed wide-band-response signal and the second addressed wide-band-response signal are addressed to a third tag of the system by including in the addressed wide-band-response signals a destination identifier of the third tag. Preferably, distances are determined respectively from the third tag to the first and second tags by measuring a round trip time delay including time of flights of the addressed wide-band signals to and from the third tag; and position information of the third tag is calculated based on the distances measured either by the reader getting the wide band response signal, or by the one or the 'relaying' tags. Preferably, when the wide band addressed response signals are received by the reader and include overlapping wide band response signals, the overlapping wide band response signals are distinguished by demodulating the overlapping wide band response signals. Preferably, when the reader does not receive an expected wide band response signal to the addressed wide-band-message signals, the reader waits for a random period of time and retransmits the addressed wide-band-message signals.

According to the present invention there is provided a wireless transceiver included in readers and/or tags as elements of a radio frequency identification system. The wireless transceiver includes an addressing mechanism which addresses a wide-band message signal by including in the message signal a destination identifier of at least one element of the system, and produces an addressed wide-band message signal. A transmitter transmits the addressed wide-band message signal. Preferably, the wireless transceiver further includes a receiver which receives the addressed wide-band message signal typically by acquiring, locking and demodulating the signal, and a processor which reads the addressed wide-band message signal and recognizes the destination identifier. Preferably, when the addressed wide-band signal undergoes multi-path reflections the receiver includes a multi-path compensation mechanism which compensates at least in part for the multi-path reflections. The compensation mechanism may include reviewing a list of source identifiers associated with the addressed wide-band signal and upon finding multiple identical source identifiers in the list within a previously defined period of time, identical identifier(s) are removed from the list. Preferably, the wide-band wireless transceiver, includes a time measurement mechanism which measures round trip delay between transmitting the addressed wide band message signal and receiving a response to the addressed wide band message signal from an element of the system. Preferably, the wide-band wireless transceiver includes a radio frequency detection mechanism attached to the receiver which detects presence of radio frequency activity in a time window and solely in the absence of RF activity responds to the addressed wide-band message signal during the time window. However, in the presence of the radio frequency activity during the time window, the detection mechanism detects for RF activity again during the new time window. Preferably, the processor relays at least a portion of said addressed wide band message signal to another element of the system.

According to the present invention there is provided a method for communicating between the elements using wide-band signals in a radio frequency identification system of elements including a reader and tags. The method includes relaying a query from a querying element to relaying elements of the system by transferring at least one datum, e.g. destination identifier, of the query from the querying element to the relaying elements of the system, wherein the query is communicated in a single cell using the wide-band signals without interfering with each other. Preferably, position information is determined of a destination element by the relaying, wherein the query includes requests for time of flight information of signals communicated between the querying element and the relaying elements of the system. Preferably, the time of flight information includes a round trip delay time between a transmitted signal and a signal received in response to said transmitted signal. The transmitted signal and the response signal are communicated between one or more querying elements and a relaying element. Preferably, the relaying is performed synchronously by the relaying elements and the time of flight information is calculated by the querying element.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
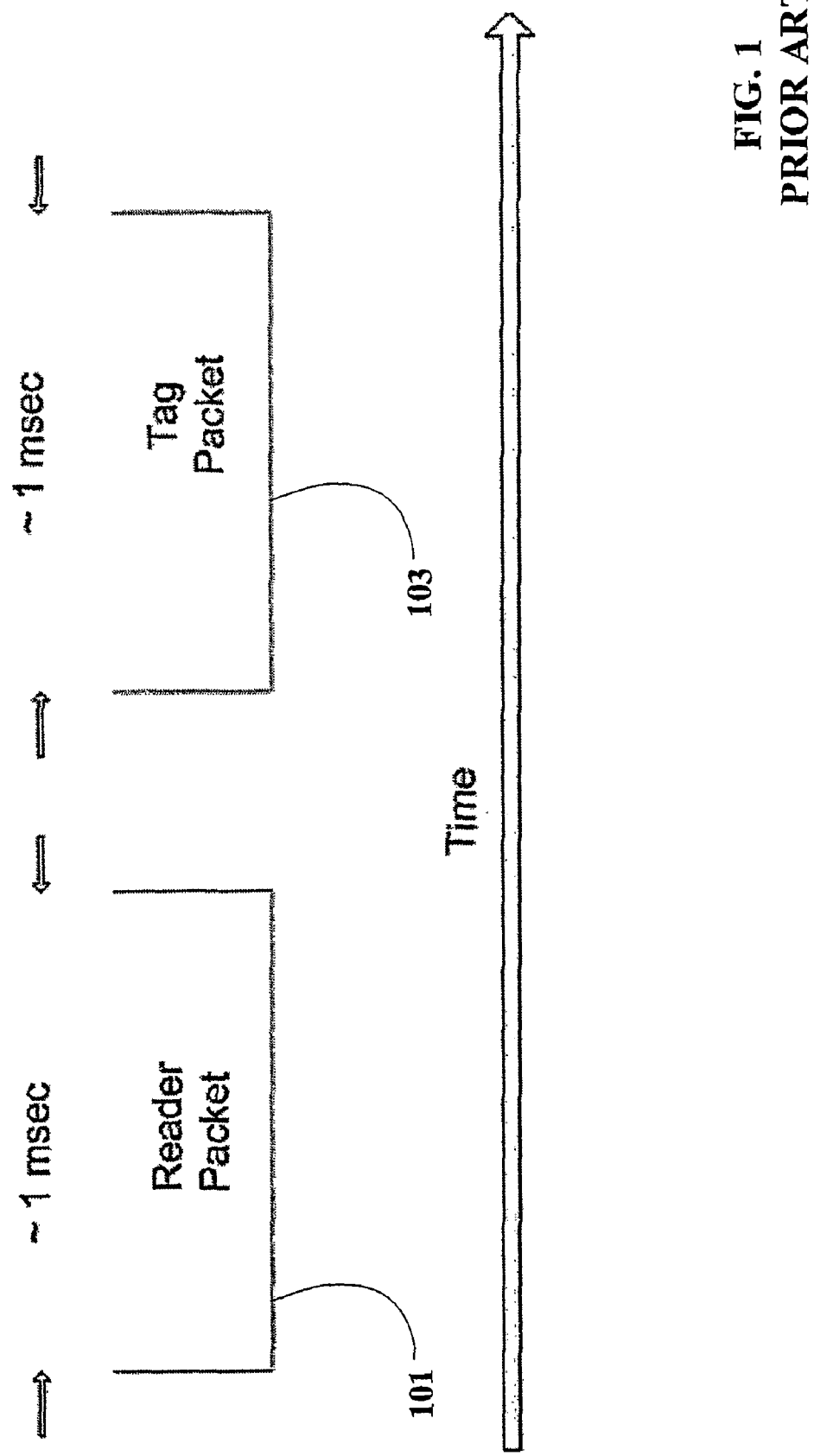
FIG. 1 is a prior art drawing of RFID signals of a conventional RFID system.
Figure 2:
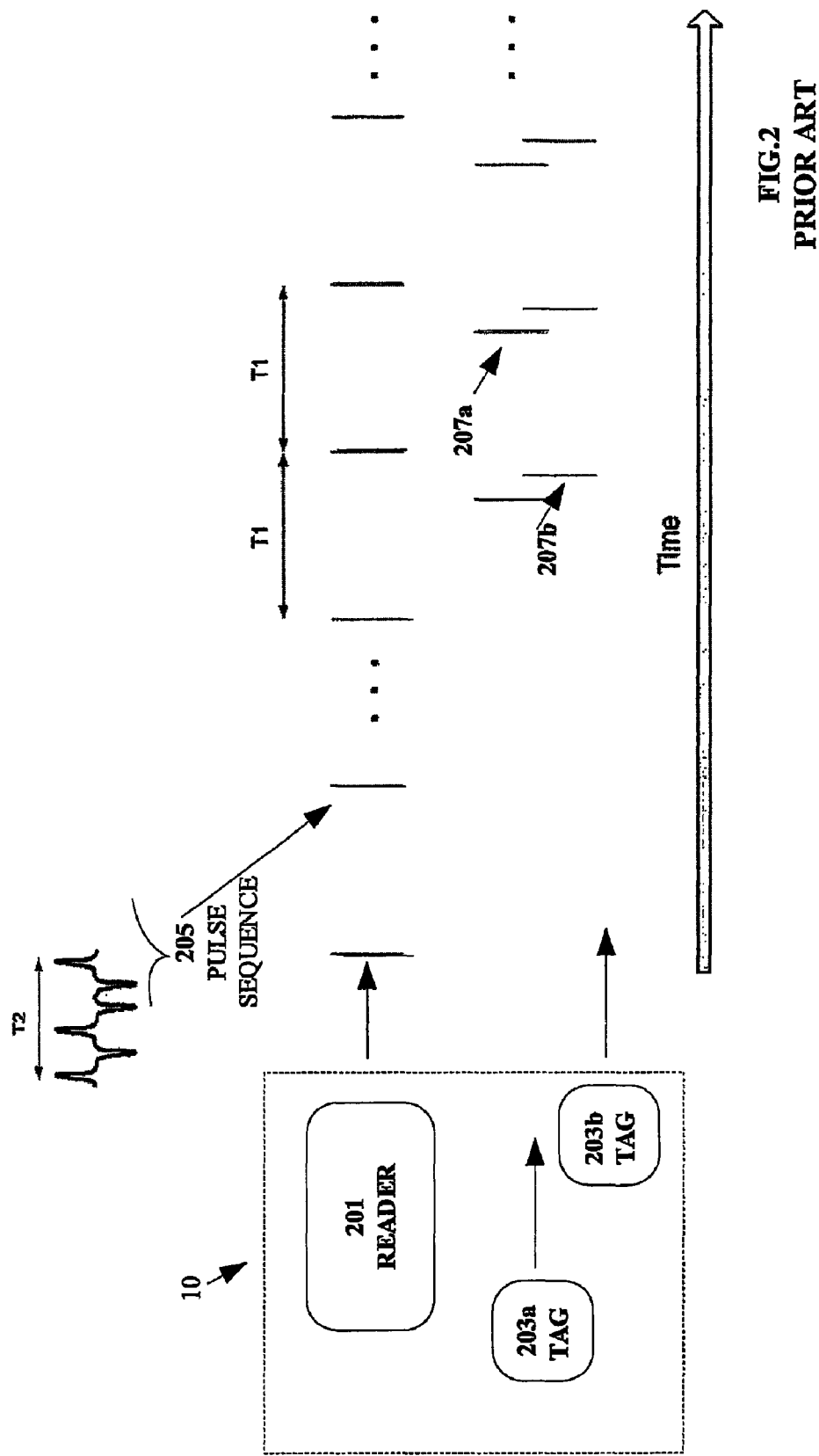
FIG. 2 is a prior art drawing of a wide band broadcast RFID system.

The present invention is of a system and method of unicast and/or multicast RFID identification, communication and distance measurement employing wide band transmission. Specifically, the system and method includes addressing wide band messages to elements, e.g. readers and/or tags of an RFID system.

The principles and operation of a system and method of addressed RFID communication, according to the present invention, may be better understood with reference to the drawings and the accompanying description.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

By way of introduction, the present invention discloses an RFID communication system having the capability of communicating with tags each having a known address or identifier. In particular, the present invention is characterized by many parallel and independent communications links, and/or by tag to tag communication, allowing, for instance, for determination of a tag location by communicating through other tags. Whereas embodiments of the present invention includes a physical interface (PHY), including a packet structure similar to the prior art system of PCT/IL2003/00358, an embodiment of the present invention further includes a medium access control (MAC) such as included in IEEE 802.15.4 which is appropriate for addressing, or a similar standard with message structure that allows for 'relay' of addressed messages. The IEEE 802.15.4 standard is included herein for all purposes as if entirely set forth herein.

In the context of the present invention, tags and readers function similarly although in practice readers typically have a capacity to communicate in parallel with multiple tags whereas tags typically communicate in parallel with a smaller number of readers and other tags.

Figure 3:
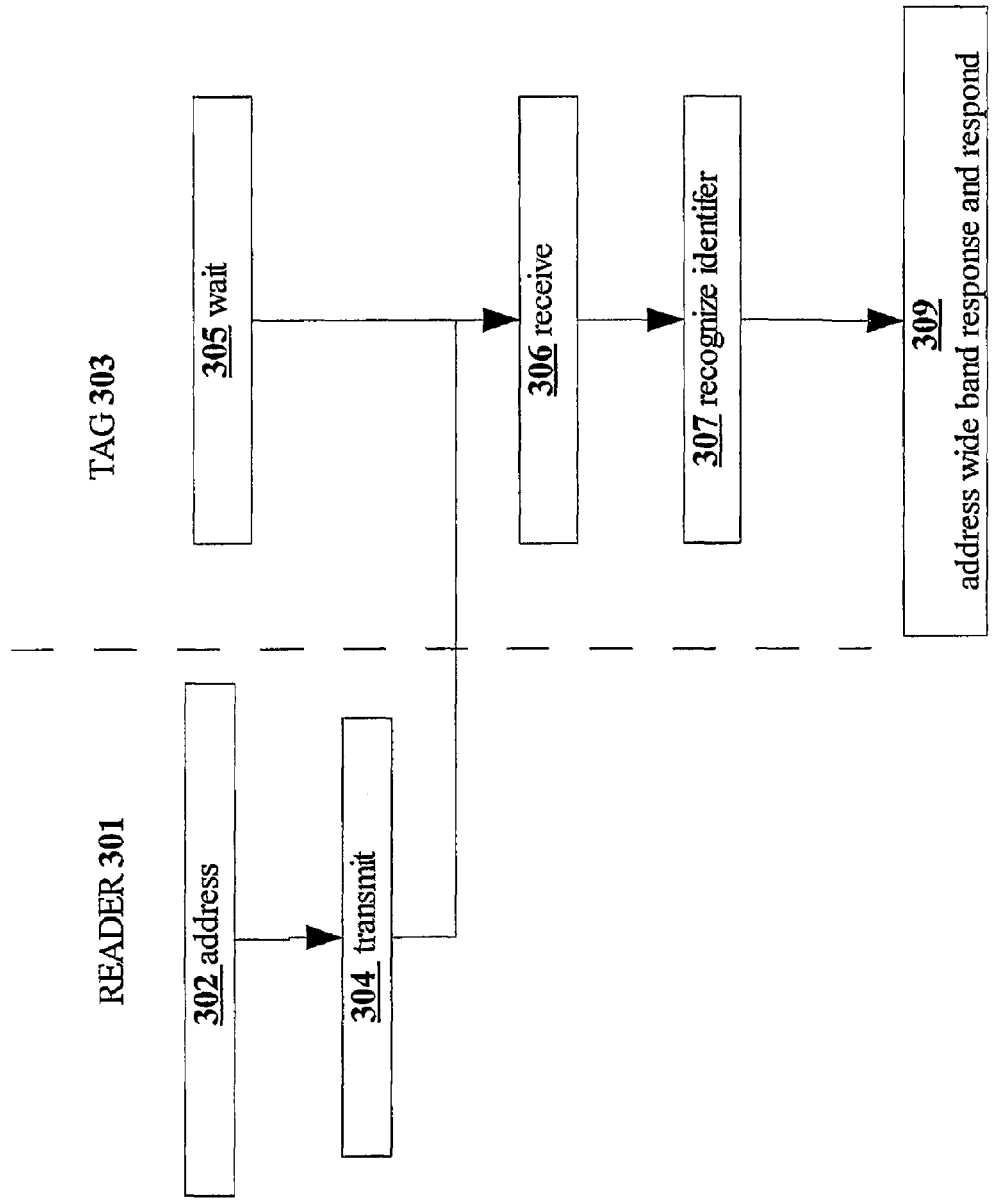
FIG. 3 is a simplified flow drawing of a method, according to an embodiment of the present invention.
Figure 4:
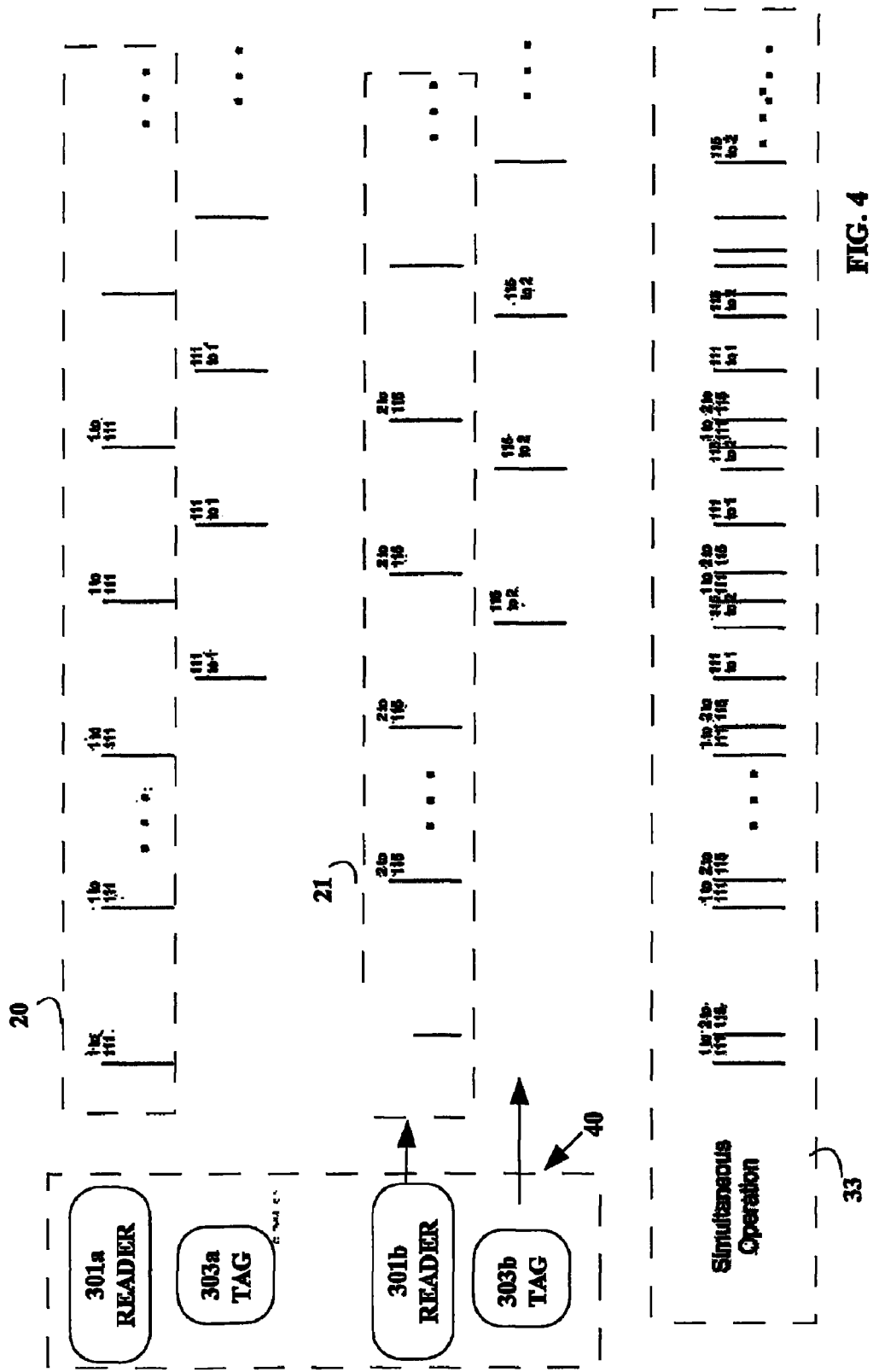
FIG. 4 is a simplified drawing of a unicast or multicast wide band transmissions, according to an embodiment of the present invention.

Referring now to the drawings, reference is now made to FIG. 3 which illustrates a method and to FIG. 4 which illustrates a corresponding RFID system 40, according to an embodiment of the present invention. RFID system 40 includes readers 301 and tags 303. Reader 301a addresses (step 302) tag 303a by including in signal 20 a previously defined identifier or address of tag 303a and transmits (step 304) signal 20. In the meantime, tag 303a is waiting (step 305) for addressed signal 20. Upon receiving (step 306) addressed signal 20, tag 303a recognizes (step 307) and addresses a wide band response signal and responds (step 309). The wide band response signal is typically addressed to reader 301a or alternatively to another element or elements of the system depending on the content of the received message in signal 20. Tag 303b operates similarly as tag 303a, for instance by responding to a signal, for instance from reader 301b. An overlapping plot 33 of simultaneous signals show that signals 20 and 21 as well as signals from reader 301b and tag 303b co-exist in the same space or cell without interfering with each other. In an exemplary embodiment of the present invention, the message signal is an addressed message, i.e., contains the address of a single destination or a group, and only that destination or group may respond. In case the signal received by tag 303 contains multiple overlapping messages sent by different readers 301, tag 303 responds to each message as if sent separately, and preferably using timing of the individual messages, by synchronizing individually on the preambles of the individual messages. Preferably, the response to a message signal begins as soon as the synchronization on the preamble of the message signal is complete, typically during the response period of the message signal.

In an exemplary embodiment of the present invention, as mentioned above, tags 303 delay the transmission of the wide band response signal by a pseudo-random delay period in order to reduce the chances of a collision occurring between their corresponding transmissions. Alternatively or additionally to reducing the predetermined correction factor, in these embodiments, reader 301 subtracts the length of the random delay period from the measured time between the transmission of the wide band message signal 20 and receiving the wide band response signals.

Another embodiment of the present invention includes collision sense multiple access (CSMA) for avoiding collisions. When tag 303a is ready to respond to the wide-band message signal from reader 301a in a 'time window', tag 303a first checks if there is no RF activity in that specific time window (e.g. about 100 nsec) in the 'periodic time domain' synchronized with the wide band signal from reader 301. If tag 303a does detect RF activity possibly emitted by another tag 303b, tag 303a will pick a new random timing parameter and repeat the process.

In an exemplary embodiment of the present invention, reader 301 checks if the probability of collision (in response to a multicast addressed signal) is above some predefined level, and if it does, issues another message which addresses fewer elements. In another exemplary embodiment of the present invention, reader 301 does not operate any collision resolution method, as the chances of a collision are low and such resolution methods are not required.

Tag 303 wide band response signal may contain data. The data content may include specific data customized to the specific received wide band message signal 20, for example responding to a specific reader identifier in the wide band message signal 20 so that multiple readers 301 may be used without interference in the same vicinity.

In an exemplary embodiment of the present invention, response signals include identifiers of tags 303 that transmitted the responses. A list of received identifiers of tags 303 is reviewed to determine whether a single identifier appears twice. Multiple appearances of signals from a single tag 303, i.e., with a single identifier, may be attributed to multi-path reflections or alternatively to tag 303 transmitting several times. Therefore, the second occurrence of the identifier of tag 303, i.e., the occurrence with the longer delay is removed from the list of responding tags 303.

When reader 301 expects a response from tag 303, reader 301 sends a message to tag 303, and the response which may contain an identifier of reader 301 is expected after a given time interval. If an expected response is not detected, reader 301 may resend the packet after waiting a random delay. The random delay period may be increased each time a message is repeated, for example, by multiplying the period each time by two. After a few times the message may be discarded and failure to establish communications has been declared.

While tag 303 is waiting (step 305) to receive wide band message signal 20, tag 303 is scanning in the time domain or scanning in the frequency domain especially whenever there is an uncertainty in the frequency. It is to be understood that receiving (step 306) a message signal does not necessarily disable receiving of other overlapping signals. Tag 303 may limit the number of concurrently received messages due to resource limitations. Ideally tag 303 would process all separable messages. For example, messages which include individual pulses that are not collocated on a time scale are separable.

In an exemplary embodiment of the present invention, tags 303 scan in the time domain and whenever tags 303 are not transmitting or receiving signals, they are deactivated into a sleep mode in order to conserve energy. Optionally, in the sleep mode, tags 303 are activated periodically with a duty cycle of, for example, 1%. In an exemplary embodiment of the invention, during the sleep mode, tags 303 are activated for about 200 ns every period of about 20 microseconds. Optionally, the time between activation periods of tags 303 is different than the time between consecutive pulses of wide band message signal 20, such that after up to a predetermined number of activation periods an activation period will coincide with a pulse sequence.

In an exemplary embodiment of the present invention when tags 303 are scanning in the frequency domain, tags 303 are sweeping the center frequency of the demodulator (FIG. 8b Ref 80) in steps such as to cover the desired frequency range. During each period of time the receiver central frequency is changed until wide band message signal 20 is detected.

Figure 5:
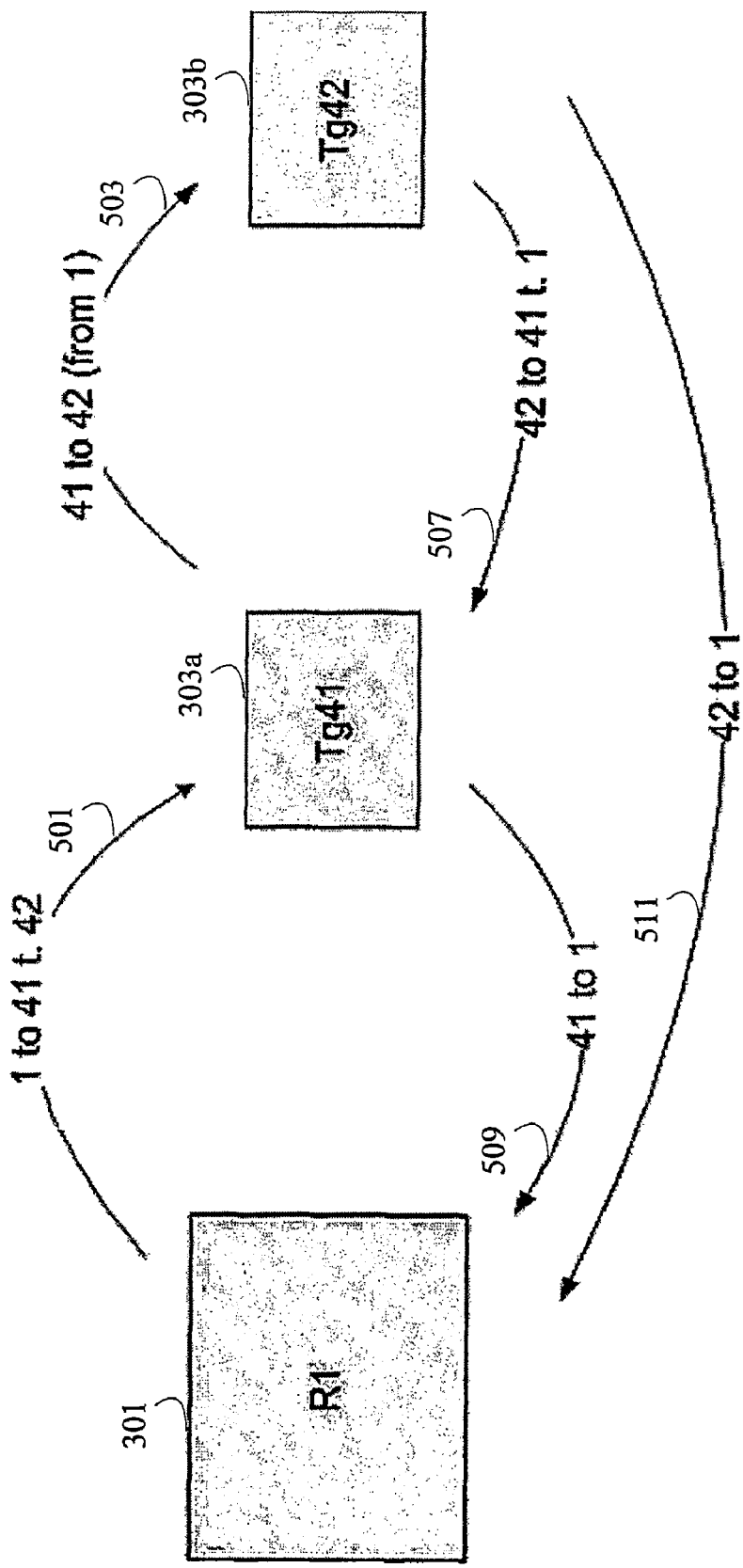
FIG. 5 is a system drawing illustrating the use of addressed wide band messaging for relaying to an out of range tag.

Reference is now made to FIG. 5 which illustrates a system and method for relaying information (using tag to tag transmission) in RFID system 40. Reader 301 in step 501 transmits an addressed message to tag 303a. The addressed message includes a query to tag 303b which is for instance out of range for direct communications with reader 301. Tag 303a opens the message after recognizing that the message is addressed to tag 303a. Upon opening the message and reading that there is a query addressed to tag 303b, tag 303a responds (step 503) with a response message addressed to tag 303b. Tag 303b receives and opens the response message from tag 303a and the query from reader 301. In response, tag 303b responds with a response message including a response to the query either directly to reader 301 in step 511 or alternatively to tag 303a in step 507 which relays (step 509) the response to reader 301.

Figure 6:
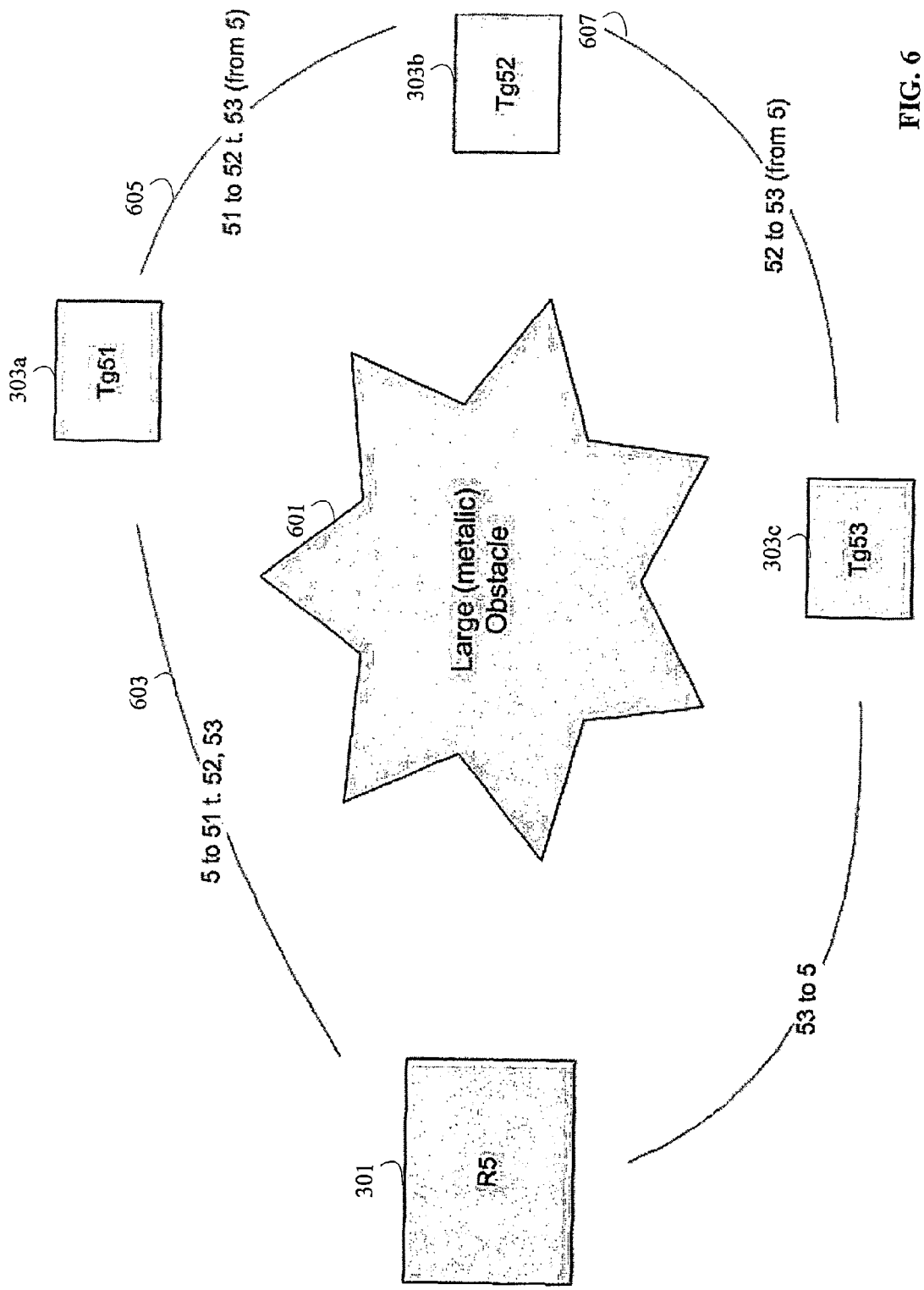
FIG. 6 is a system drawing illustrating the use of addressed wide band messaging for relaying around an obstacle.

Reference is now made to FIG. 6 which illustrates system 40 and a method for relaying information around an obscuring obstacle 601 which blocks direct communications between reader 301 and tag 303b. Reader 301 addresses a specific tag (which is used as a relay for the message to tag 303b) or a group of tags 303, i.e. by multicast, including tag 303a and tag 303c to relay a query to tag 303b. In step 603, tag 303a establishes communications with reader 301 and receives the query intended for tag 303b. In step 605, tag 303a establishes communications with tag 303b and relays the query from reader 301 to tag 303b. Tag 303b addresses the response to the query to tag 303c, as a unicast or a multicast message together with other tags, e.g. tag 303a, and in step 607 establishes communications with tag 303c and responds to the query with the response message. Tag 303c relays (step 607) the response message to reader 301.

Figure 7:
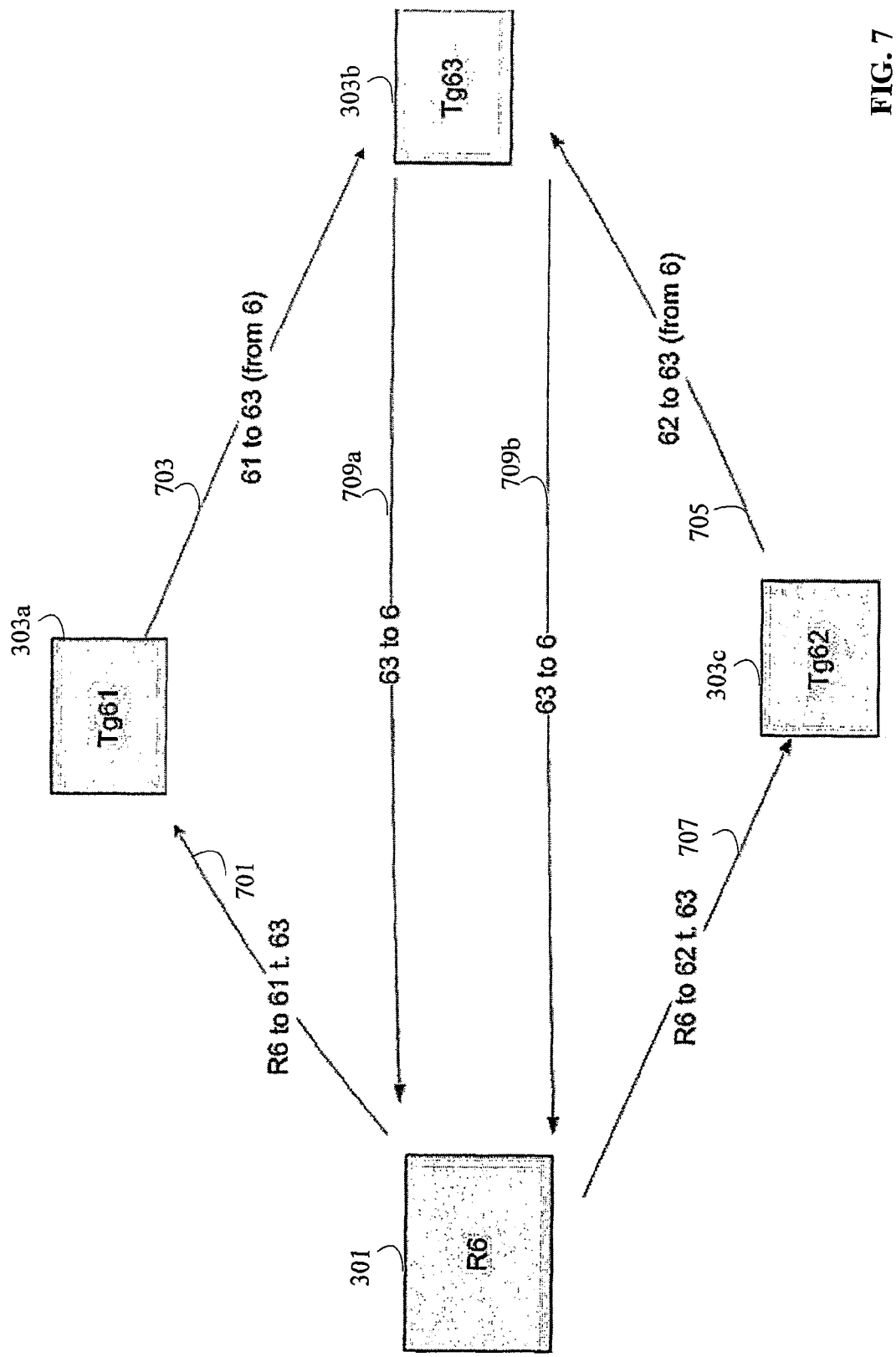
FIG. 7 is a system drawing illustrating the use of addressed wide band messaging for distance measurement by triangulation using 'relay' tags.

Reference is now made to FIG. 7 which illustrates system 40 and a method for determining position information for tag 303b, according to an embodiment of the present invention, using a reader and two (other) tags with known locations. Reader 301 addresses (step 701) tag 303a and in step 707 similarly addresses tag 303c. In steps 701 and 707, reader 301 requests position information from tag 303b, respectively from tag 303a and tag 303c. Tags 303a and 303c each establish communications respectively in steps 703 and 705, by addressing a message to tag 303b. Tag 303b responds by addressing and transmitting a message respectively to tag 303a and tag 303c. Possibly, tag 303b measures round trip delays for communications signals 703 and 705 sent respectively to and from tags 303a and 303c. Subsequently tag 303b establishes communications 709 with reader 301 and transmits round trip delay information to reader 301 for subsequent processing into position information of tag 303b. Alternatively, tags 303a and 303c measure round trip delay of communications signals 703 and 705 respectively and transmit the round trip delay information to reader 301. Alternatively, reader 301 gets the response from tag 303b and measures a round trip delay (from Reader 301 to tag 303a to 303b and back to Reader 301; and similarly for 301 to 303c to 303b and back to Reader 301), and further makes use of the known location of tags 303a and 303c (and their internal delays) to establish the location of tag 303b. The determined round trip delay is optionally compared to an upper threshold value. For example, if the round trip delay is greater than the upper threshold value, the respective wide band response signal is ignored.

In an exemplary embodiment of the present invention, the round trip delay is determined by subtracting a predetermined correction factor from the measured time between the transmission of the wide band message signal 20 and receiving the wide band response signals. The predetermined correction factor optionally compensates for a known delay of tags 303 between receiving the wide band message signal 20 and transmitting the wide band response signal and/or for the operation time of reader 301. In another alternative exemplary embodiment of the present invention, the same correction factor is used for all tags 303. Alternatively, different tags 303 have different predetermined correction factors and reader 301 optionally selects the factor to be used, from a pre-configured list or a hash function, according to the identity of the specific tag 303 and/or according to any other information known about tag 303 and/or received from the tag 303. The different correction factors may be due to different hardware structures of tags 303 and/or due to a purposeful different delay configured into different groups of tags 303 in order to reduce the chances of a collision between the plurality of wide band response signals transmitted by tags 303.

Figure 8A:
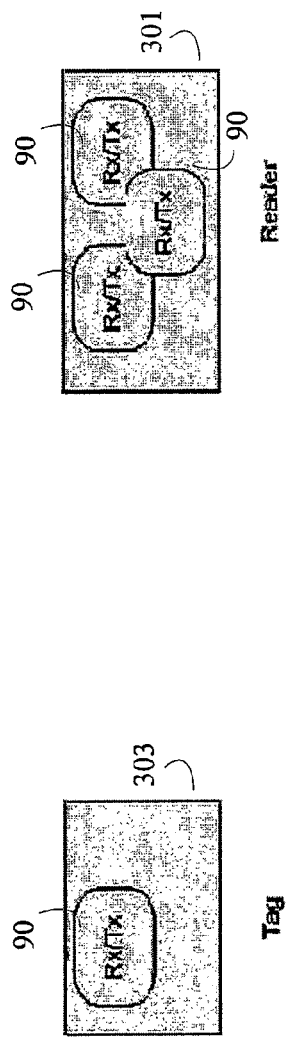
FIG. 8 is a simplified block diagram of a transceiver circuit used in the system of FIG. 4.
Figure 8B:
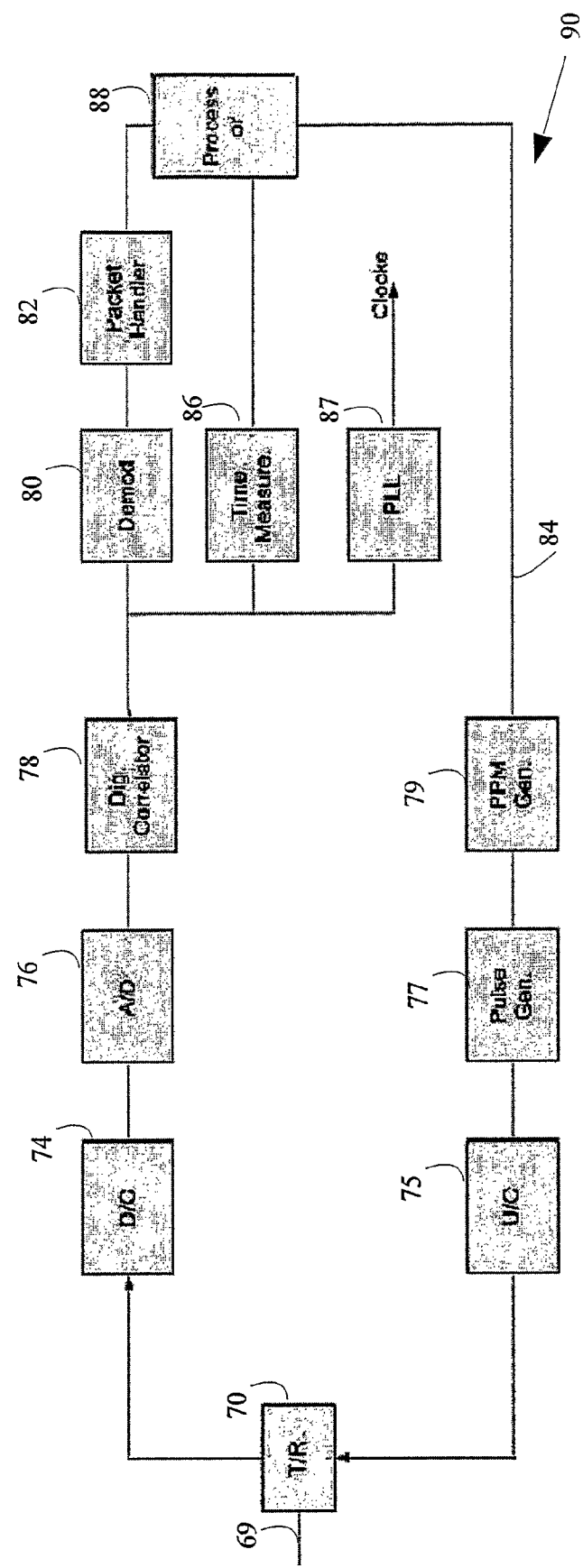

Reference is now made to FIG. 8a, an electronic block diagram of a transceiver of reader 301 and/or tag 303, according to an embodiment of the present invention. FIG. 8a shows tag 303 with a single transceiver block 90. Reader 301 typically includes multiple transceiver blocks 90 for simultaneous communication with multiple tags 303 and/or other readers 301. Referring now to FIG. 8b, an antenna (not shown), typically attached at input/output 69 is tuned to receive and transmit wide band signals, e.g. signals 33. As is known in the art, an optional matching network (not shown) performs impedance matching between the reception and/or transmission blocks of tag 303 and the antenna. A switch 70 is used for alternately connecting a reception path or a transmission path to the antenna. The received signal, optionally after amplification (amplifier not shown) at input 69 is down converted at a down-converter block 74 and converted to a digital signal at analog/digital (A/D) converter 76. The digital signal is decoded with typically with a direct sequence spread spectrum decorrelator 78 and subsequently demodulated in a demodulator block 80 which extracts the data packets of the message. The data packets are opened up at packet handler 82 and serial and/or parallel data from the packets are input to a processor 88. Optionally clock extraction for synchronization between different elements of system 40 is performed by outputting the decorrelated signal from digital correlator 78 to a phase locked loop (PLL) 87. PLL 87 is controlled by a high frequency reference clock providing a high frequency clock signal, for example 200 MHz with a 5 ns (nano second) cycle. Optionally, the clock cycle should be sufficient to sample the signal bandwidth according to Nyquist criterion. Time measurement, for instance for measuring round trip delay is performed using a time measurement block 86 which receives as input the decorrelated signal output from digital correlator 78.

Packet generation, i.e. generating the packet data of wide band message signal 20 is performed typically by processor 88. According to an exemplary embodiment of the packets generated by processor 88 are output to a pulse position modulation (PPM) delay generator 79. The output of generator 79 is provided to a pulse generator 77 which passes its output to a power amplifier (not shown) for transmission through switch 70, impedance matching network (not shown) and antenna (not shown).

After detecting by tag 303 a preamble of a first wide band message signal, tag 303, continues after detecting the first preamble to search for, and detect other preambles from other overlapping messages. If a second preamble is detected, packet handler 82 has to handle two (or more) packets together. Moreover, during transmission of the wide-band addressed signal and during the reception of the response signal, the reader is detecting a request from a different reader and first reader may respond to the second reader. One possible implementation is performing multitasking in software or in hardware as known in the art.

In an alternative exemplary embodiment of the present invention, the data content of the signals transmitted by reader 301 and/or tags 303 are encrypted by using any known in the art method.

In an exemplary embodiment of the present invention, reader 301 is adapted to have a distance resolution of between few meters to few centimeters. Optionally, signals of a bandwidth of about tens of MHz to hundreds of MHz or even higher are used. In an exemplary embodiment of the invention, the transmitted signals correspond to "Ultra WideBand" (UWB) signals, as known in the art.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

While the invention has been described with respect to a limited number of embodiments, it will be appreciated that many variations, modifications and other applications of the invention may be made.

What is claimed is:

1. In a radio frequency identification system of elements including at least one reader and a plurality of tags, including a first tag and a second tag, a method for communicating between the at least one reader and the tags, the method comprising:
   addressing a wide-band-message signal by including in said signal a first-tag identifier of the first tag, thereby producing an addressed wide-band-message signal with a destination being the first tag along with other tag identifiers for respective other tags forming a first set of addressed tags;
   transmitting said addressed wide-band-message signal by the reader;
   determining a probability of collision for the addressed wide-band-message signal transmitted relative to a threshold and not conducting transmission of an additional addressed wide-band-message signal responsive to the probability of collision being below the threshold;
   transmitting the additional addressed wide-band-message signal addressed for a second set of addressed tags responsive to the probability of collision exceeding the threshold, the second set of addressed tags being a smaller set of tags than the first set of addressed tags;
   waiting to receive by the first tag said addressed wide-band-message signal; and
   upon receiving said addressed wide-band message signal and recognizing said identifier, responding to said addressed wide-band-message signal by transmitting by the first tag an addressed wide-band response signal.

2. The method, according to claim 1, wherein said signals include at least one pulse sequence, wherein each pulse sequence includes a short train of pulses.

3. The method, according to claim 1, wherein said responding to said addressed wide band message signal begins during said receiving of said addressed wide band message signals.

4. The method, according to claim 1, wherein prior to said transmitting by the first tag an addressed wide-band response signal, further comprising delaying said transmitting of the wide band response signal by a pseudo-random delay period in order to reduce a probability of a collision.

5. The method, according to claim 1, further comprising, prior to said responding: addressing by the first tag said addressed wide-band response signal by including in said signal at least one identifier of at least one other element of the system.

6. The method, according to claim 5, further comprising relaying at least a portion of a query from the reader to said at least one other element of the system by transferring at least one datum of the query from said addressed wide-band-message signal to said addressed wide-band response signal.

7. The method, according to claim 1, further comprising determining a distance from the reader to the first tag by measuring a round trip time delay including a time of flight of at least one of said wide-band signals; determining a distance from at least one other element of the system to the first tag by measuring a round trip time delay including a time of flight of at least one other wide-band signal communicating between the first tag and said at least one other element; and calculating position information of said first tag based on said distances.

8. The method, according to claim 1, further comprising determining by the reader a probability of a collision between expected wide band response signals and when said probability is greater than a previously determined threshold, transmitting by the reader at least one additional addressed wide band message signal, whereby said at least one additional addressed wide band message signal initiates a new communication session of the system thereby reducing a collision probability.

9. The method, according to claim 1, wherein said waiting includes scanning in the time domain.

10. The method, according to claim 1, when said first tag is active solely a portion of the time and thereby conserves power, further comprising deactivating said first tag into a sleep mode; and activating said first tag periodically with a predefined duty cycle.

11. The method, according to claim 1, wherein said waiting includes scanning in the frequency domain by sweeping a center frequency in predefined steps such as to cover a desired frequency range until said addressed wide band message signal is detected.

12. The method, according to claim 1, further comprising addressing a second wide-band-message signal by including in said signal a second-tag identifier of the second tag, thereby producing a second addressed wide-band-message signal; transmitting said second addressed wide-band-message signal; waiting to receive by the second tag said second addressed wide-band-message signal; and upon receiving said second addressed wide-band-message signal and recognizing said second-tag identifier, responding to said second addressed wide-band-message signal by transmitting by the second tag a second wide band addressed response signal.

13. The method, according to claim 12, wherein said addressed wide-band-response signal and said second addressed wide-band-response signal are addressed to a third tag of the system by including in said addressed wide-band-response signals a third-tag identifier of said third tag.

14. The method, according to claim 13, further comprising determining distances respectively from said third tag to said first and second tags by measuring a round trip time delay including respective time of flights of said addressed wide-band-response signals transmitted to said third tag; and calculating position information of said third tag based on said distances.

15. The method, according to claim 12, wherein said wide band addressed response signals are received by the reader and include overlapping wide band response signals, the method further comprising distinguishing said overlapping wide band response signals by demodulating said overlapping wide band response signals.

16. The method, according to claim 12, wherein the reader does not receive an expected wide band response signal to at least one of said addressed wide-band-message signals, the method further comprising waiting for a random period of time; and retransmitting said at least one addressed wide-band-message signal.

17. In a radio frequency identification system of elements including at least one reader and a plurality of tags, wherein at least one of said elements includes a wide-band wireless transceiver comprising:
   an addressing mechanism which addresses a wide-band message signal by including in said message signal an identifier of at least one element of the system, and thereby produces an addressed wide-band message signal along with other tag identifiers for respective other elements forming a first set of addressed tags, and
   a transmitter which transmits said addressed wide-band message signal for which a probability of collision is determined relative to a threshold such that transmission of an additional addressed wide-band-message signal is not conducted responsive to the probability of collision being below the threshold, and such that transmission of the additional addressed wide-band-message signal that is addressed for a second set of addressed tags is conducted responsive to the probability of collision exceeding the threshold, the second set of addressed tags being a smaller set of tags than the first set of addressed tags.

18. The wide-band wireless transceiver, according to claim 17, further comprising: a receiver which receives said addressed wide-band message signal, and a processor which reads said addressed wide-band message signal and recognizes said identifier.

19. The wide-band wireless transceiver, according to claim 18, wherein said addressed wide-band signal undergoes a plurality of multi-path reflections and wherein said receiver includes a multi-path compensation mechanism which compensates at least in part for said multi-path reflections.

20. The wide-band wireless transceiver, according to claim 19, wherein said compensation mechanism includes reviewing a list of source identifiers associated with said addressed wide-band signal and upon finding a plurality of identical source identifiers in said list within a previously defined period of time, removing at least one said identical identifier from said list.

21. The wide-band wireless transceiver, according to claim 18, further comprising: a time measurement mechanism which measures round trip delay between transmitting said addressed wide band message signal and receiving a response to said addressed wide band message signal from at least one of the elements of the system.

22. The wide-band wireless transceiver, according to claim 18, further comprising: a radio frequency detection mechanism attached to said receiver which detects presence of radio frequency activity in a time window and solely in the absence of said activity responds to said addressed wide-band message signal during said time window and in the presence of said radio frequency activity during said time window detects again for RF activity during a new time window.

23. The wide-band wireless transceiver, according to claim 18, wherein said processor relays at least a portion of said addressed wide band message signal to another element of the system.

* * * * *

UNITED STATES PATENT AND TRADEMARK OFFICE
CERTIFICATE OF CORRECTION

PATENT NO. : 8,193,913 B2  
APPLICATION NO. : 11/574883  
DATED : June 5, 2012  
INVENTOR(S) : Raphaeli et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 736 days.

Signed and Sealed this  
Seventeenth Day of March, 2020

Andrei Iancu  
*Director of the United States Patent and Trademark Office*